(12) United States Patent
Hachitani et al.

(10) Patent No.: US 6,677,046 B2
(45) Date of Patent: Jan. 13, 2004

(54) GLASS CERAMIC

(75) Inventors: Yoichi Hachitani, Tokyo (JP); Keiji Hosoda, Yamanashi (JP); Kenji Matsumoto, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/106,880

(22) Filed: Mar. 27, 2002

(65) Prior Publication Data

US 2003/0039771 A1 Feb. 27, 2003

(30) Foreign Application Priority Data

Mar. 27, 2001 (JP) .......................... 2001-089864

(51) Int. Cl.$^7$ .................. B32B 17/00; C03C 10/14; C03C 3/076
(52) U.S. Cl. .................. 428/426; 428/1.1; 428/1.62; 428/689; 428/702; 501/4; 501/55; 501/65; 501/66; 501/68; 359/110; 359/111; 359/158
(58) Field of Search .................. 428/34, 1, 426, 428/1.1, 428, 1.3, 432, 1.32, 688, 1.6, 689, 702, 1.62; 501/4, 55, 65, 66, 68; 349/158, 110, 111

(56) References Cited

U.S. PATENT DOCUMENTS

| | | | | |
|---|---|---|---|---|
| 4,018,612 A | * | 4/1977 | Chyung | 501/4 |
| 4,733,947 A | * | 3/1988 | Ota et al. | 349/158 |
| 4,755,488 A | * | 7/1988 | Nagashima | 501/4 |
| 5,336,643 A | * | 8/1994 | Goto et al. | 501/4 |
| 5,734,454 A | * | 3/1998 | Omae et al. | 349/86 |
| 6,031,591 A | * | 2/2000 | Hamanaka | 349/95 |
| 6,404,475 B1 | * | 6/2002 | Nakayoshi et al. | 349/141 |
| 6,413,906 B1 | * | 7/2002 | Shimatani et al. | 501/4 |

FOREIGN PATENT DOCUMENTS

| | | | |
|---|---|---|---|
| JP | 47-5558 | * | 2/1972 |
| JP | 62-182135 | * | 8/1987 |
| JP | 2-293345 | * | 12/1990 |
| JP | 3-23237 | * | 1/1991 |
| JP | 2516537 | * | 9/1992 |

* cited by examiner

Primary Examiner—Deborah Jones
Assistant Examiner—G. A. Blackwell-Rudasill
(74) Attorney, Agent, or Firm—Nixon & Vanderhye P.C.

(57) ABSTRACT

A glass ceramic having properties of low thermal expansion, high transmittance in a visible light region and low specific gravity, and a glass ceramic substrate made of the glass ceramic are provided. The glass ceramic has a crystal phase containing a β-quartz solid solution precipitated by heat treatment of a matrix glass for a glass ceramic, and the matrix glass has a glass composition comprising 55 to 70 mol % of $SiO_2$, 13 to 23 mol % of $Al_2O_3$, 11 to 21 mol % of an alkali metal oxide, provided that the alkali metal oxide contains 10 to 20 mol % of $Li_2O$ and contains 0.1 to 3 mol % of $Na_2O$ and $K_2O$ in total, 0.1 to 4 mol % of $TiO_2$ and 0.1 to 2 mol % of $ZrO_2$, the total content of said components being at least 95 mol %, and further comprising 0 to less than 0.2 mol % of BaO, 0 to less than 0.1 mol % of $P_2O_5$, 0 to less than 0.3 mol % of $B_2O_3$ and 0 to leas than 0.1 mol % of $SnO_2$.

23 Claims, 2 Drawing Sheets

(a)

(b)

(c)

(d)

GLASS CERAMIC

FIELD OF THE INVENTION

The present invention relates to a glass ceramic, a glass ceramic substrate, an opposite substrate for a liquid crystal panel and a dustproof substrate for a liquid crystal panel. More specifically, the present invention relates to a glass ceramic having properties such as a low thermal expansion property, a high transmittance in a visible light region and a low specific gravity, a glass ceramic substrate that is made of the above glass ceramic and is suitable for use as a dustproof substrate for a liquid crystal projector or a substrate (TFT-opposite substrate) facing a substrate with a thin film transistor in a liquid crystal device, and an opposite substrate and a dustproof substrate for a liquid crystal panel, each of which comprises the above glass ceramic.

PRIOR ART

A glass ceramic formed by depositing a fine crystal phase in a glass is widely known as a glass having the property of low expansion. For example, JP-B-47-5558 discloses a glass ceramic having a thermal expansion coefficient of $\pm 0.2 \times 10^{-7}/° C.$ at and around room temperature. The glass ceramic is used in the fields of a reflecting mirror of a large-sized astronomical telescope, a laser gyroscope, a standard or a surface plate and heat-resistant cooking utensils.

Conventionally, glasses of this type are colored in yellow or brown even if no colorant is contained, and they have poor transmittance as compared with general glass, so that their transmittance is often a barrier against the use thereof as a substitute for quartz glass.

In recent years, a liquid crystal projector is commercially available as one of large-screen television sets. The key portion of the liquid crystal projector is a liquid crystal panel made of a quartz substrate, and dustproof glass substrates for defocusing are attached to both the surfaces of the liquid crystal panel for preventing the projection of a foreign matter if such a foreign matter adheres to the liquid crystal panel surfaces. The liquid crystal substrate is formed of quartz, and essentially, it is desirable to use quartz as the above dustproof glass. Since, however, quartz glass is expensive, low-expansion transparent glass ceramic is substituted in some liquid crystal projectors. Similarly, of the two glass substrates constituting a liquid crystal panel, one on the side where no TFT is formed ("opposite substrate" hereinafter) is replaced with a low-expansion transparent glass ceramic substrate in some liquid crystal projectors. However, conventional low-expansion transparent glass ceramics have poor transmittance to light in a short wavelength region as compared with quartz glass, so that such ceramics degrade the performance of the liquid crystal projector with regard to screen image qualities. Particularly, conventional low-expansion transparent glass ceramics have low transmittance at and around 400 nm, and such glass ceramics look yellow or brown when visually observed. For this reason, projected images are inevitably affected by the coloring of the glass ceramics.

Further, no ultraviolet-curable resin can be used for bonding a dustproof glass due to a low transmittance at a wavelength of 400 nm or shorter. It is therefore general practice to use a heat-curable resin for the bonding. However, the heat-curing procedure takes a time and causes a productivity problem.

Further, a molten glass of a low-expansion transparent glass ceramic of the above type has a high viscosity, and convection of the molten glass does not easily occur, so that it is difficult to produce a homogeneous glass. Further, another defect is that the melting temperature thereof is high, so that a melting apparatus is greatly limited or that an ultra-high temperature melting furnace is required, which increases the production cost thereof.

Further, the transparent glass ceramic of the above type has another problem that its crystallization takes a time, so that its productivity is low. In the above JP-B-477558, Examples describe glass ceramics for which the holding time period is 4 to 100 hours at a temperature elevation rate of 8° C./hour. For example, in Example in which the holding time period is 24 hours at 800° C., it takes 32 hours before cooling is started.

Further, most of transparent glass ceramics of the above type have a specific gravity of 2.5 or more. The specific gravity is an important factor in use of a transparent glass ceramic including the use in a liquid crystal display. Since quartz glass has a specific gravity of 2.2, such a specific gravity of the glass ceramic sometimes comes to be a barrier against a use thereof as a substitute for the quartz glass.

Under the circumstances, attempts have been made in various ways to improve low-expansion transparent glass ceramics in transmittance and melting properties.

For example, JP-A-323237 and JP-A-2293345 describe glass ceramics containing no $TiO_2$. It is said that Ti ion in the co-presence of impurities such as Fe ion, etc., greatly colors a glass ceramic, and it has been attempted to prevent the coloring by incorporating such Ti ion. In the above glass ceramic, $TiO_2$ is a nucleating component of the glass ceramic and is therefore replaced with $ZrO_2$. Since, however, $ZrO_2$ is a component that is not easily dissolved in glass, it is liable to remain, and it is difficult to produce a homogeneous glass, so that its melting requires a high temperature of approximately 1,600° C.

Japanese Patent 2,516,537 discloses a low-expansion transparent glass ceramic containing 3 to 6% by weight of $Li_2O$ and substantially containing none of $Na_2O$ and $K_2O$. However, since the above glass contains none of $Na_2O$ and $K_2O$, and further since the content of $Li_2O$ is 6% by weight or less, it has a high melt viscosity, so that homogenization takes a time. Further, since the above glass ceramic contains none of $Na_2O$ and $K_2O$ that are components for suppressing the crystallization rate, the crystallization rate of the glass increases, and the glass during the crystallization is liable to undergo cracking. It is therefore required to decrease the temperature elevation rate, or hold the glass at a relatively low temperature for a long period of time, so that the crystallization does not sharply take place and that the cracking is accordingly prevented. For example, Example of the above Japanese Patent describes holding time periods of 10 hours at a nucleating temperature and 10 hours at a crystal growth temperature. In any case, the crystallization takes a long time and is liable to decrease the productivity of the glass ceramic. The glass ceramic is improved in transparency as compared with conventional products, while the transmittance thereof is low at and around 400 nm, and its color is yellowish. The glass ceramic of the above Japanese Patent is therefore hardly suitable for use in a display.

DISCLOSURE OF THE INVENTION

It is an object of the present invention to provide a glass ceramic which is easily meltable and has properties such as a low thermal expansion property, a high transmittance in a visible light region and a low specific gravity imparted by carrying out crystallization treatment for a short period of time, a glass ceramic substrate formed of the above glass ceramic, and an opposite substrate and a dustproof substrate for a liquid crystal panel, each of which comprises the above glass ceramic.

For achieving the above object, the present inventors have made diligent studies and as a result has found that a glass ceramic having a crystal phase containing β-quartz solid solution precipitated by heat treatment of a glass ceramic matrix glass having a specific composition or a glass ceramic having a crystal phase containing a β-quartz solid solution and having specific physical properties suits the above objects. The present invention has been completed on the basis of the above findings.

That is, the present invention provides:

(1) A glass ceramic having a crystal phase containing a β-quartz solid solution precipitated by heat treatment of a matrix glass for a glass ceramic, the matrix glass having a glass composition comprising 55 to 70 mol % of $SiO_2$, 13 to 23 mol % of $Al_2O_3$, 11 to 21 mol % of an alkali metal oxide, provided that the alkali metal oxide contains 10 to 20 mol % of $Li_2O$ and contains 0.1 to 3 mol % of $Na_2O$ and $K_2O$ in total, 0.1 to 4 mol % of $TiO_2$ and 0.1 to 2 mol % of $ZrO_2$, the total content of said components being at least 95 mol %, and further comprising 0 to less than 0.2 mol % of BaO, 0 to less than 0.1 mol % of $P_2O_5$, 0 to less than 0.3 mol % of $B_2O_3$ and 0 to less than 0.1 mol % of $SnO_2$ (to be referred to as "glass ceramic I" hereinafter).

(2) A glass ceramic as recited in the above (1), wherein the glass matrix contains at least one component selected from the group consisting of $Cs_2O$, MgO, CaO, SrO, ZnO, $La_2O_3$, $Nb_2O_5$, $Y_2O_3$, $Bi_2O_3$, $WO_3$, $As_2O_3$, $Sb_2O_3$, F and $SO_3$, and the total content of the at least one component selected from said group and BaO, $P_2O_5$, $B_2O_3$ and $SnO_2$ is 5 mol % or less.

(3) A glass ceramic having a crystal phase containing a β-quartz solid solution precipitated by heat treatment of a matrix glass for a glass ceramic and having a spectral transmittance of at least 70% at 400 to 750 nm when it has a thickness of 5 mm, the matrix glass having a glass composition comprising 55 to 70 mol % of $SiO_2$, 13 to 23 mol % of $Al_2O_3$, 11 to 21 mol % of alkali metal oxides, provided that the content of $Li_2O$ is 10 to 20 mol % and that the total content of $Na_2O$ and $K_2O$ is 0.1 to 3 mol %, 0.1 to 4 mol % of $TiO_2$ and 0.1 to 2 mol % of $ZrO_2$, the total content of said components being at least 95 mol % (to be referred to as "glass ceramic II-1" hereinafter).

(4) A glass ceramic having a crystal phase containing a β-quartz solid solution precipitated by heat treatment of a matrix glass for a glass ceramic and having a spectral transmittance of at least 85% at 400 to 750 nm when it has a thickness of 1.1 mm, the matrix glass having a glass composition comprising 55 to 70 mol % of $SiO_2$, 13 to 23 mol % of $Al_2O_3$, 11 to 21 mol % of an alkali metal oxide, provided that the alkali metal oxide contains 10 to 20 mol % of $Li_2O$ and contains 0.1 to 3 mol % of $Na_2O$ and $K_2O$ in total, 0.1 to 4 mol % of $TiO_2$ and 0.1 to 2 mol % of $ZrO_2$, the total content of said components being at least 95 mol % (to be referred to as "glass ceramic II-2" hereinafter).

(5) A glass ceramic as recited in the above (3) or (4), wherein the matrix glass contains 5 mol % or less of at least one component selected from the group consisting of $Cs_2O$, MgO, CaO, SrO, BaO, ZnO, $La_2O_3$, $Nb_2O_5$, $Y_2O_3$, $Bi_2O_3$, $WO_3$, $P_2O_5$, $B_2O_3$, $As_2O_3$, $Sb_2O_3$, $SnO_2$, F and $SO_3$.

(6) A glass ceramic as recited in one of the above (1) to (5), which has an average linear expansion coefficient of from $-10\times10^{-7}/°$ C. to $+10\times10^{-7}/°$ C. in a temperature range of from 30° C. to 300° C.

(7) A glass ceramic having a crystal phase containing a β-quartz solid solution, having a spectral transmittance of at least 70% at 400 to 750 nm when it has a thickness of 5 mm, and having an average linear expansion coefficient of from $-10\times10^{-7}/°$ C. to $+10\times10^{-7}/°$ C. in a temperature range of from 30° C. to 300° C. (to be referred to as "glass ceramic III-1" hereinafter).

(8) A glass ceramic having a crystal phase containing a β-quartz solid solution, having a spectral transmittance of at least 85% at 400 to 750 nm when it has a thickness of 1.1 mm, and having an average linear expansion coefficient of from $-10\times10^{-7}/°$ C. to $+10\times10^{-7}/°$ C. in a temperature range of from 30° C. to 300° C. (to be referred to as "glass ceramic III-2" hereinafter).

(9) A glass ceramic as recited in one of the above (1) to (8), wherein the crystal phase has a volume of at least 50% based on the total volume of the glass ceramic.

(10) A glass ceramic as recited in one of the above (1) to (9), wherein the crystal phase has an average crystal grain size of 5 to 100 nm.

(11) A glass ceramic as recited in one of the above (1) to (10), which has a specific gravity of 2.2 or more but less than 2.5.

(12) A glass ceramic substrate made of the glass ceramic as recited in one of the above (1) to (11).

(13) An opposite substrate for use in a liquid crystal panel having a light-transmitting substrate and an opposite electrode formed thereon, the light-transmitting substrate being the glass ceramic substrate as recited in the above (12).

(14) An opposite substrate as recited in the above (13), wherein the liquid crystal panel has (a) a driving substrate having a substrate, a pixel electrode formed on said substrate and a switching element connected to said pixel electrode, (b) an opposite substrate that is positioned opposite to said driving substrate through a predetermined space and has a light-transmitting substrate and an opposite electrode in a position being on said light-transmitting substrate and facing said pixel electrode, and (c) a liquid crystal layer which is held in a predetermined space formed between said driving substrate and a driving substrate and is drivable by a voltage upon application of the voltage between said pixel electrode and the opposite electrode.

(15) An opposite substrate as recited in the above (14), which further has a light-shielding film formed in a position that is opposite to the switching element of the driving substrate and is on the light-transmitting substrate.

(16) A dustproof substrate for a liquid crystal panel having a transparent substrate and an anti-reflection film formed thereon, the transparent substrate being the glass ceramic substrate recited in the above (12).

(17) A dustproof substrate for a liquid crystal panel having a transparent substrate and an anti-reflection film formed thereon, the transparent substrate being made of a glass ceramic substrate which has a spectral transmittance of at least 70% at 400 to 750 nm when it has a thickness of 5 mm.

(18) A dustproof substrate for a liquid crystal panel having a transparent substrate and an anti-reflection film formed thereon, the transparent substrate being made of a glass ceramic substrate which has a spectral transmittance of at least 85% at 400 to 750 nm when it has a thickness of 1.1 mm.

(19) A dustproof substrate as recited in the above (17) or (18), wherein the glass ceramic substrate has a crystal phase containing a β-quartz solid solution and has an average linear expansion coefficient of from $-5\times10^{-7}/°$C. to $+5\times10^{-7}/°$C. in a temperature range of from 30° C. to 300° C.

(20) A dustproof substrate as recited in the above (17), (18) or (19), wherein the glass ceramic substrate has a specific gravity of at least 2.2 but less than 2.5.

(21) A dust proof substrate as recited in one of the above (16) to (20), wherein the liquid crystal panel has (a) a driving substrate having a substrate, a pixel electrode formed on said substrate and a switching element connected to said pixel electrode, (b) an opposite substrate that is positioned opposite to said driving substrate through a predetermined space and has a light-transmitting substrate and an opposite electrode in a position being on said light-transmitting substrate and facing said pixel electrode, and (c) a liquid crystal layer which is held in a predetermined space formed between said driving substrate and an opposite substrate and is drivable by a voltage upon application of the voltage between said pixel electrode and the opposite electrode, the dustproof substrate being for use on an outer surface of at least one of said driving substrate and said opposite substrate.

EMBODIMENTS OF THE INVENTION

Figure 1:
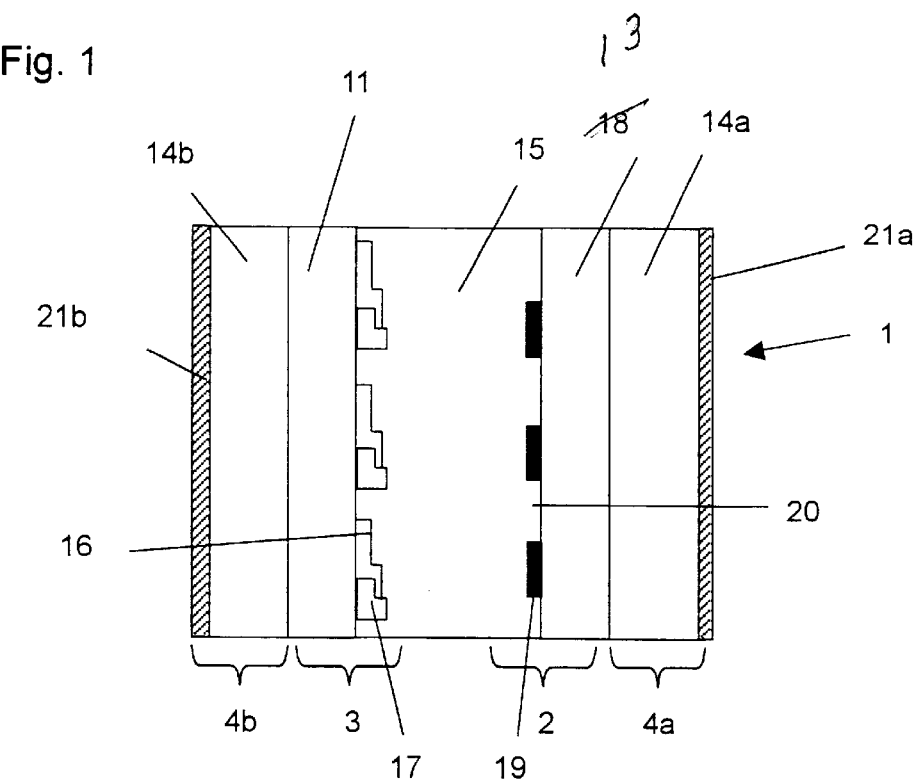
FIG. 1 schematically shows one example of structure of a liquid crystal panel having a dustproof substrate.

The glass ceramic of the present invention includes the following three embodiments, a glass ceramic I, a glass ceramic II and a glass ceramic III. Further, the glass ceramic II includes glass ceramics II-1 and II-2, and the glass ceramic III includes glass ceramics III-1 and III-2.

That is, the glass ceramic I has a crystal phase containing a β-quartz solid solution precipitated by heat treatment of a matrix glass for a ceramic glass, the matrix glass having a glass composition comprising 55 to 70 mol % of $SiO_2$, 13 to 23 mol % of $Al_2O_3$, 11 to 21 mol % of an alkali metal oxide, provided that the alkali metal oxide contains 10 to 20 mol % of $Li_2O$ and contains 0.1 to 3 mol % of $Na_2O$ and $K_2O$ in total, 0.1 to 4 mol % of $TiO_2$ and 0.1 to 2 mol % of $ZrO_2$, the total content of said components being at least 95 mol %, and further comprising 0 to less than 0.2 mol % of BaO, 0 to less than 0.1 mol % of $P_2O_5$, 0 to less than 0.3 mol % of $B_2O_3$ and 0 to leas than 0.1 mol % of $SnO_2$.

The glass ceramic II includes a glass ceramic II-1 and a glass ceramic II-2. The glass ceramic II-1 has a crystal phase containing β-quartz solid solution precipitated by heat treatment of a matrix glass for a glass ceramic and has a spectral transmittance of at least 70% at 400 to 750 nm when it has a thickness of 5 mm, the matrix glass having a glass composition comprising 55 to 70 mol % of $SiO_2$, 13 to 23 mol % of $Al_2O_3$, 11 to 21 mol % of alkali metal oxides, provided that the content of $Li_2O$ is 10 to 20 mol % and that the total content of $Na_2O$ and $K_2O$ is 0.1 to 3 mol %, 0.1 to 4 mol % of $TiO_2$ and 0.1 to 2 mol % of $ZrO_2$, the total content of said components being at least 95 mol %.

The glass ceramic II-2 has a crystal phase containing a β-quartz solid solution precipitated by heat treatment of a matrix glass for a glass ceramic and has a spectral transmittance of at least 85% at 400 to 750 nm when it has a thickness of 1.1 mm, the matrix glass having a glass composition comprising 55 to 70 mol % of $SiO_2$, 13 to 23 mol % of $Al_2O_3$, 11 to 21 mol % of alkali metal oxides, provided that the content of $Li_2O$ is 10 to 20 mol % and that the total content of $Na_2O$ and $K_2O$ is 0.1 to 3 mol %, 0.1 to 4 mol % of $TiO_2$ and 0.1 to 2 mol % of $ZrO_2$, the total content of said components being at least 95 mol %.

The glass ceramic III includes a glass ceramic III-1 and a glass ceramic III-2. The glass ceramic III-1 has a crystal phase containing a β-quartz solid solution, having a spectral transmittance of at least 70% at 400 to 750 nm when it has a thickness of 5 mm, and has an average linear expansion coefficient of from $-10\times10^{-7}/°$ C. to $+10\times10^{-7}/°$ C. in a temperature range of from 30° C. to 300° C. The glass ceramic III-2 has a crystal phase containing a β-quartz solid solution, having a spectral transmittance of at least 85% at 400 to 750 nm when it has a thickness of 1.1 mm, and has an average linear expansion coefficient of from $-10\times10^{-7}/°$ C. to $+10\times10^{-7}/°$ C. in a temperature range of from 30° C. to 300° C.

First, the glass ceramics I and II will be explained below.

The matrix glass for the glass ceramics I and II has a characteristic feature in that the content of alkali metal components such as $Li_2O$, $Na_2O$, $K_2O$ and the like is greater than that in any conventional low-expansion transparent glass ceramic. The above feature produces the following advantages. ① The melt viscosity of the glass is decreased, so that a homogeneous glass ceramic can be easily produced. ② The melting temperature of the glass can be decreased, so that the limitation to a melting apparatus can be decreased. ③ The melting temperature of the glass is low, and impurities from a container or a refractory material are therefore not easily included in the glass during the melting of the glass, so that the coloring of the glass ceramic can be controlled to be a low level. ④ The glass during its crystallization is free from cracking even if the crystallization time period is decreased, so that the production cost thereof can be decreased. ⑤ The specific gravity of the glass ceramic can be decreased.

It is said that when a conventional glass has an $Li_2O$ content in the range specified in the present invention, a crystal precipitated has a large size and greatly impairs the transparency of the glass ceramic (Japanese Patent No. 2,516,537). The present inventors have found that even when the content of $Li_2O$ is increased, the formation of a large-sized crystal can be prevented by controlling the crystal precipitation on the basis of other component.

Further, the following has been found. Since the matrix glass contains at least 11 mol % of an alkali metal oxide, the melt viscosity of the glass is decreased, and the convection of the molten glass is promoted, so that the glass is improved in uniformity. Further, the melting temperature of the glass is decreased, and the coloring caused by inclusion of foreign matte from a container with the molten glass in it can be prevented. At the same time, the specific gravity of the glass can be decreased.

It is also another feature that the matrix glass for a glass ceramic, provided by the present invention, contains a relatively large amount of $Na_2O$ and/or $K_2O$. In conventional transparent glass ceramic, the content of the above alkali metal component that increases a thermal expansion coefficient is controlled to be as low as possible (JP-A-62-182135).

The present inventors have found that a glass ceramic having an average linear expansion coefficient of from $-10 \times 10^{-7}/°$ C. to $+10 \times 10^{-7}/°$ C. in a temperature range of from 30 to 300° C. can be obtained from a matrix glass having a glass composition that can attain a well balance on the basis of an increase in a precipitated crystal amount even if the content of $Na_2O$ and/or $K_2O$ is increased.

The matrix glass is heat-treated for crystallization, whereby there can be obtained a glass ceramic in which a crystal phase is dispersed in an amorphous phase. Of the precipitated crystal phases, the amount of a β-quartz solid solution and/or a β-eucryptite solid solution (these will be referred to as "β-quartz solid solution" hereinafter) is the largest. Of these, preferably, a crystal phase of the β-quartz solid solution alone is precipitated. Further, preferably, the crystal phase has a size of approximately 5 to 100 nm, and the volume of the crystal phase in the glass ceramic is approximately at least 50%.

Further, $Na_2O$ and/or $K_2O$ have/has not only the effect of preventing the crystallization of the glass thereby to prevent the fogging or coloring of the glass ceramic but also the effect of suppressing cracking during crystallization. The temperature elevation rate in the crystallization treatment can be therefore increased, so that the time period for the treatment can be decreased.

The amount ranges of components of the glass composition of the matrix glass for the glass ceramics I and II of the present invention will be explained below.

$SiO_2$ is a basic glass component and essential for forming a β-quartz solid solution. When the content of $SiO_2$ is less than 55 mol %, the devitrification resistance is degraded, and no transparent glass ceramic can be obtained. When it exceeds 70 mo %, it is difficult to melt the glass. The content of $SiO_2$ is therefore limited to 55 to 70 mol %. It is preferably 63 to 68 mol %.

$Al_2O_3$ is also an essential component for precipitating a β-quartz solid solution. When the content of $Al_2O_3$ is less than 13 mol %, a coarse crystal is formed, and no transparent glass can be obtained. When it exceeds 23 mol %, the devitrification resistance of the glass is degraded, and the glass ceramic is liable to be cloudy. The content of $Al_2O_3$ is therefore limited to 13 to 23 mol %, and it is preferably 15 to 20 mol %.

$Li_2O$ is also an essential component for precipitating a β-quartz solid solution. When the content of $Li_2O$ is less than 10 mol %, the glass has a high viscosity, so that the glass is hard to melt. When it exceeds 20 mol %, a coarse crystal is formed, and no transparent glass ceramic can be obtained. The content of $Li_2O$ is therefore limited to 10 to 20 mol %, and it is preferably 12 to 17 mol %.

$Na_2O$ and $K_2O$ are important components for improving the glass in meltability and also for adjusting thermal expansion properties, controlling the crystallization rate of the glass and preventing the clouding and cracking of the glass. When the total content of $Na_2O$ and $K_2O$ is less than 0.1 mol %, the above effects cannot be accomplished. When the above total content exceeds 3 mol %, the glass is liable to have a large thermal expansion coefficient. The total content of $Na_2O$ and $K_2O$ is therefore limited to 0.1 to 3 mol %, and it is preferably 0.5 to 2 mol %, more preferably 1 to 2 mol %.

When the total content of the alkali metal oxides is less than 11 mol %, the glass has a high viscosity, and it is difficult to produce a homogeneous glass. When it exceeds 21 mol %, it is difficult to prevent the formation of a coarse crystal, and no colorless and transparent glass ceramic can be obtained. The total content of the alkali metal oxides is therefore limited to 11 to 21 mol %, and it is preferably 12 to 17 mol %.

$TiO_2$ is an important component for forming a crystal nucleus. When the content of $TiO_2$ is less than 0.1 mol %, there is produced no effect thereof, and crystallization does not easily take place during heat treatment. When it exceeds 4 mol %, the devitrification resistance is degraded. The content of $TiO_2$ is therefore limited to 0.1 to 4 mol %, and it is preferably 1 to 3 mol %.

As described already, the co-presence of Ti ion and Fe ion greatly colors the glass ceramic. However, the present invention uses raw materials of an optical glass grade, so that the glass ceramic of the present invention substantially contains no Fe ion. Therefore, a colorless transparent glass ceramic can be obtained although it contains $TiO_2$. The content of $ZrO_2$ can be made smaller than the content of $ZrO_2$ that is conventionally used alone as a nucleating component. As a result, the melting temperature can be decreased, and finer crystals can be precipitated due to the co-presence of $TiO_2$ and $ZrO_2$, which further results in an improvement in the transmittance of the ceramic glass.

$ZrO_2$ is also an important component for precipitating a fine crystal when used as a component for forming a crystal nucleus, in combination with $TiO_2$. When the content of $ZrO_2$ is less than 0.1 mol %, the effect thereof is not produced. When it exceeds 2 mol %, the glass is hard to melt. The content of $ZrO_2$ is therefore limited to 0.1 to 2 mol %, and it is preferably 0.5 to 1.5 mol %.

Although not being any essential components, $Cs_2O$, MgO, CaO, SrO, BaO, ZnO, $La_2O_3$, $Nb_2O_5$, $Y_2O_3$, $Bi_2O_3$, $WO_3$, $P_2O_5$, $B_2O_3$, $As_2O_3$, $Sb_2O_3$, $SnO_2$, F and $SO_3$ can be used as required in a total amount of 5 mol % or less for decreasing the melt viscosity, clarification and adjusting the thermal expansion coefficient and the transmittance. When the above total amount exceeds 5 mol %, a detrimental effect is caused on the devitrification resistance, the transmittance, and the like.

$Cs_2O$ has effects similar to the effects of $K_2O$. However, $Cs_2O$ as a raw material is more expensive than $Na_2O$ and $K_2O$, and increases the specific gravity of the glass ceramic. The content of $Cs_2O$ is therefore preferably less than 1 mol %.

MgO can be used for improving the glass in meltability and adjusting the thermal expansion property of the glass ceramic. MgO is particularly preferred since it can work to easily increase the thermal expansion coefficient. However, MgO decreases the transmittance at and around 400 nm and is liable to color the glass ceramic in brown. The content of MgO is therefore preferably 0 to 3 mol %, particularly preferably 0 to 1 mol %.

While CaO, SrO and BaO can be used for adjusting the thermal expansion property of the glass ceramic, they are liable to form a coarse crystal and are liable to decrease the transmittance of the glass ceramic. Particularly, SrO and BaO have the above tendency to a great extent. Further, SrO and BaO are also liable to increase the specific gravity.

From the viewpoint of the prevention of coloring, particularly, the content of BaO is preferably 0.2 mol %, more preferably, 0.1 mol % or less, and it is desirable to incorporate no BaO.

The total content of CaO, SrO and BaO is preferably less than 3 mol %. Further, it is desirable to incorporate no SrO like BaO.

ZnO is preferred for improving the meltability and maintaining the transmittance. However, it is liable to increase the specific gravity. The content of ZnO is preferably 0 to 3 mol %, particularly preferably 0 to 1 mol %.

From the viewpoint of the prevention of the coloring caused on the glass ceramic by visible light scattering due to excess growth of a crystal phase (particularly, scattering on a shorter wavelength side), the content of $P_2O_5$ is preferably less than 0.1 mol %, more preferably 0.05 mol % or less, and it is desirable to incorporate no $P_2O_5$. For the same reason, the content of $B_2O_3$ is preferably less than 0.3 mol %, more preferably less than 0.1 mol %, and it is desirable to incorporate no $B_2O_3$. In the present invention, the total content of $Li_2O$ and the alkali metal oxide is defined to be in the predetermined range, so that the meltability of the glass is not at all impaired even if the above components are decreased in content or omitted.

$As_2O_3$ is greatly limited in use since it is a harmful component to human bodies. However, it is effective as a clarifier, and it is desirably used in view of properties since it neither causes any decrease in the transmittance of the glass ceramic nor causes any decrease in homogeneity of the glass. Even when the content of $As_2O_3$ exceeds 0.5 mol %, no further clarification effect can be obtained. The content of $As_2O_3$ is therefore preferably 0.5 mol % or less, and it is further preferred to incorporate no $As_2O_3$. In a conventional matrix glass for a glass ceramic, $As_2O_3$ not only works as a clarifier but also works to suppress coloring. A conventional matrix glass therefore contains $As_2O_3$ although it is a toxic component. In the matrix glass of the present invention, the coloring of the glass ceramic can be suppressed even without incorporating $As_2O_3$, and the present invention therefore can accomplish a spectral transmittance in a visible light region and a high transmittance at a wavelength of 400 nm.

$Sb_2O_3$ is an effective component as a clarifier. However, when the content thereof is 0.1 mo % or more, the glass ceramic is liable to be colored, so that the content of $Sb_2O_3$ is preferably less than 0.1 mol %, more preferably 0.05 mol % or less. Since the glass ceramic of the present invention has a low melt viscosity, $Sb_2O_3$ can fully work as a clarifier even if the content thereof is 0.05 mol % or less.

$SnO_2$ also has a clarification effect. When the content thereof is 0.1 mol % or more, the glass ceramic is liable to be colored, so that the content of $SnO_2$ is preferably less than 0.1 mol %, more preferably 0.05 mol % or less, and it is desirable to incorporate no $SnO_2$.

$SO_3$ is the most preferred as a clarifier. The effect of $SO_3$ as a clarifier has been known for a long time and has been widely used in soda lime glass. The present inventors have found that $SO_3$ is very effective for preventing the coloring of the glass ceramic and promoting the melting of $ZrO_2$ in addition to the function thereof as a clarifier for a glass. $SO_3$ can be introduced as a sulfate of a component to be incorporated. Particularly preferred is a sulfate of an alkali component (e.g., sodium sulfate, potassium sulfate or lithium sulfate) or zirconium sulfate. When $Sb_2O_3$ is used in a glass of this type, an immiscible layer may be generated in the surface of a molten glass. Further, the immiscible layer may catch a raw material for $ZrO_2$ and may prevent the melting of $ZrO_2$, so that $ZrO_2$ remains non-melted in a final product. $SO_3$ promotes the glass-forming reaction of raw materials, and unlike $Sb_2O_3$, $SO_3$ does not catch $ZrO_2$ within an immiscible layer to leave it non-melted. The content of $SO_3$ is preferably such that a sulfate is introduced in an amount corresponding to at least 0.1 mol % but less than 3 mol % of an alkali component.

Other components may be incorporated so long as the object of the present invention is not impaired. Undesirably, however, the specific gravity is liable to be increased.

Further, the transmittance of the glass ceramic is decreased by excess growth of a crystal phase or coloring components contained in the matrix glass. The coloring components are compounds or ions of Fe, V, Mn, Ni, Co, Cu, Ce, Cr, and the like. For obtaining the glass ceramic II-1 having a spectral transmittance of at least 70%, preferably a high transmittance of at least 90%, in the entire visible light region (400 nm to 750 nm) when the glass ceramic has a thickness of 5 mm, and for obtaining the glass ceramic II-2 having a high spectral transmittance of at least 85% when it has a thickness of 1.1 mm, it is desirable to exclude the above components.

For the above reasons, it is determined that the matrix glass has the following composition.

| | |
|---|---|
| $SiO_2$ | 55–70 mol % |
| $Al_2O_3$ | 13–23 mol % |
| Total content of alkali metal oxides | 11–21 mol % |
| $Li_2O$ | 10–20 mol % |
| Total content of $Na_2O$ and $K_2O$ | 0.1–3 mol % |
| $TiO_2$ | 0.1–4 mol % |
| $ZrO_2$ | 0.1–2 mol % |
| Total content of the above components | at least 95 mol % |

Further, for attaining a high transmittance in the entire visible light region (400 to 750 nm), the following components are limited in content as below.

| | |
|---|---|
| BaO | 0–less than 0.2 mol % |
| $P_2O_5$ | 0–less than 0.1 mol % |
| $B_2O_3$ | 0–less than 0.3 mol % |
| $SnO_2$ | 0–less than 0.1 mol % |

Further, concerning the above composition, desirably, the composition contains none of iron oxide and a lead compound, contains no $As_2O_3$, or contains none of SrO and BaO. More desirably, the composition contains none of iron oxide, a lead compound and $As_2O_3$, contains none of iron oxide, a lead compound, SrO and BaO, or contains none of $As_2O_3$, SrO and BaO. Still more desirably, the composition contains none of iron oxide, a lead compound, $As_2O_3$, SrO and BaO. Further, $SnO_2$ has a small clarification effect and colors the glass to a great extent, so that it is preferred to control the content thereof to be less than 0.1 mol %. More preferably, no $SnO_2$ is incorporated. Further, it is preferred to incorporate no CaO, for improving the devitrification resistance of the matrix glass during the production process thereof. Further, the content of $Sb_2O_3$ is preferably 0.05 mol % or less, and more preferably zero. Further, it is preferred to use any raw materials in the form of a sulfate.

The alkali metal oxide in the matrix glass is preferably a "two-components" combination of $Li_2O$ as an essential component with $Na_2O$ or $K_2O$ or a "three-components" combination of $Li_2O$, $Na_2O$ and $K_2O$. $Cs_2O$ is expensive and increases the specific gravity, so that it is preferred to incorporate no $Cs_2O$.

The above composition may contain, as an optional component, 5 mol % or less of at least one component selected from the group consisting of $Cs_2O$, MgO, CaO, SrO, BaO, ZnO, $La_2O_3$, $Nb_2O_5$, $Y_2O_3$, $Bi_2O_3$, $WO_3$, $P_2O_5$, $B_2O_3$, $As_2O_3$, $Sb_2O_3$, $SnO_2$, F and $SO_3$. These optional components are preferably contained in the form of oxides. When the above optional components are added, it is preferred to incorporate ZnO, $Sb_2O_3$ or a combination of ZnO and $Sb_2O_3$.

The matrix glass for the glass ceramic is particularly preferably a composition comprising, by mol %, 63 to 68% of $SiO_2$, 15 to 20% of $Al_2O_3$, 12 to 17% of $Li_2O$, 0.5 to 2% of $Na_2O$ and $K_2O$ in total, 1 to 3% of $TiO_2$, 0.5 to 1.5% of $ZrO_2$, 1% or less of MgO, 1% or less of ZnO and less than 0.1% of $Sb_2O_3$. For preventing an increase in specific gravity, the matrix glass is further preferably a composition comprising the above components alone. In the above ranges of the components, preferably, the total content of $Na_2O$ and $K_2O$ is 1 to 2%.

A composition of glass raw materials that are prepared, the composition of the matrix glass and the composition of the glass ceramic are almost the same.

The method for producing the matrix glass of the present invention is not specially limited, and a conventional general method can be employed. For example, oxides, hydroxides, carbonates, nitrates, chlorides, sulfates, etc., are provided as glass raw materials as required, weighed to obtain a desired composition, and these raw materials are mixed to prepare a formulated raw material. The formulated raw material is placed in a refractory crucible, melted at a temperature of approximately 1,450 to 1,550° C., stirred and clarified to form a homogeneous molten glass. For a matrix glass for a conventional glass ceramic, the melting temperature is required to be approximately 1,600° C. or very high temperature. However, the above matrix glass in the present invention can be melted at a temperature of 1,550° C. or lower. It is because of the composition of the matrix glass that the glass ceramic of the present invention is free from coloring exists in, and in addition to this, that is also because impurities do not easily come from a container or a refractory furnace which the glass comes in contact with when melted, since the glass can be melted without employing a high temperature of approximately 1,600° C. Such impurities also contain a substance that colors the glass ceramic. The composition of the matrix glass and the melting at a relatively low temperature suppress the coloring of the glass ceramic.

Then, the glass is cast into a mold to form a glass block, and the glass block is transferred to a furnace that is heated to an annealing point of the glass, and cooled to room temperature.

The glass ceramics I and II of the present invention have a crystal phase containing a β-quartz solid solution precipitated by heat treatment of the above matrix glass for a glass ceramic. And, the glass ceramic II-1 has a spectral transmittance of at least 70% at 400 to 750 nm when it has a thickness of 5 mm.

The glass ceramic II-2 has a spectral transmittance of at least 85% at 400 to 750 nm when it has a thickness of 1.1 mm.

The glass ceramics I and II of the present invention can be controlled to have an average linear expansion coefficient of $-10 \times 10^7/°$ C. to $+10 \times 10^{-7}/°$ C. in a temperature range of from 30° C. to 300° C.

The glass ceramic III-1 of the present invention is a glass ceramic having a crystal phase containing a β-quartz solid solution, having a spectral transmittance of at least 70% at 400 to 750 nm when it has a thickness of 5 mm, and having an average linear expansion coefficient of from $-10 \times 10^{-7}/°$ C. to $+10 \times 10^{-7}/°$ C. in a temperature range of from 30° C. to 300° C. The glass ceramic III-2 of the present invention is a glass ceramic having a crystal phase containing a β-quartz solid solution, having a spectral transmittance of at least 85% at 400 to 750 nm when it has a thickness of 1.1 mm, and having an average linear expansion coefficient of from $-10 \times 10^{-7}/°$ C. to $+10 \times 10^{-7}/°$ C. in a temperature range of from 30° C. to 300° C.

In the glass ceramic of the present invention, the term "crystal phase containing a β-quartz solid solution" refers to a crystal phase containing a β-quartz solid solution and/or a β-eucryptite solid solution. Above all, a glass ceramic having crystal phases containing a largest volume of a β-quartz solid solution is preferred, and a glass ceramic having a crystal phase formed of a β-quartz solid solution alone is more preferred. Further, the volume of the crystal phase based on the total volume of the glass ceramic is generally at least 50%, and the crystal phase generally has a size (average crystal grain size) of 5 to 100 nm.

When the glass ceramic is used in a color display in which light is transmitted through the glass ceramic, the transmittances to wavelengths of three primary colors (wavelengths 435.8 nm, 546.1 nm and 700 nm) are essential. Preferably, the transmittances to wavelengths of three primary colors are all at least 80%, more preferably at least 85%. Preferably, the glass ceramic of the present invention generally has a transmittance of at least 80% at 430 nm, and transmittances of at least 80% to all of wavelengths of three primary colors, when it has a thickness of 5 mm.

Further, the glass ceramic of the present invention generally has a transmittance of at least 85% at 430 nm, and transmittances of at least 85% to all of wavelengths of three primary colors, when it has a thickness of 1.1 mm.

Not only the glass ceramic of the present invention has a high transmittance in a visible light region, but also the start point thereof in an ultraviolet region shifts toward a shorter wavelength side as compared with a conventional glass ceramic. This is presumably because the crystallization rate of the glass ceramic is controlled so that crystal grain sizes of the β-quartz solid solution to be precipitated can be controlled to be small and uniform. The glass ceramic of the present invention has a transmittance of approximately at least 70% to light having a wavelength of 365 nm when it has a thickness of 1 mm, which light is useful for ultraviolet curing, so that the glass ceramic can be supplied with ultraviolet light sufficient for ultraviolet curing. Therefore, an ultraviolet-curing resin can be effectively used, so that the time period required in a bonding step can be decreased to a great extent and that the production cost in broad fields including the field of a liquid crystal projector can be decreased.

The glass ceramic of the present invention has an average linear expansion coefficient of $-10 \times 10^{-7}/°$ C. to $+10 \times 10^{-7}/°$ C. at a temperature in the range of from 30 to 300° C., and has a high transmittance in the above visible light region, and the volume change thereof caused by thermal expansion is small in a broad temperature range. Further, the glass ceramic of the present invention is also excellent in heat shock resistance. Therefore, it can be used as a substitute as a quartz glass and, at the same time, produces effect that it does not easily caused to undergo distortion or deformation by thermal expansion or shrinkage when bonded to a quartz glass. The average linear expansion coefficient in the above temperature range is preferably $-5 \times 10^{-7}/°$ C. to $+5 \times 10^{-7}/°$ C., more preferably $-2 \times 10^{-7}/°$ C. to $+2 \times 10^{-7}/°$ C. When the glass ceramic of the present invention is used as a dustproof substrate for a liquid crystal projector or as a substrate opposite to a substrate with a thin film transistor in a liquid crystal panel, desirably, the average linear expansion coefficient of the glass ceramic in environments of use of the liquid crystal projector and temperature environments (300 to 150° C.) in the production process thereof is $-10 \times 10^{-7}/°$ C. to $+10 \times 10^{-7}/°$ C., preferably $-5 \times 10^{-7}/°$ C. to $+5 \times 10^{-7}/°$ C., more preferably $-2 \times 10^{-7}/°$ C. to $+2 \times 10^{-7}/°$ C.

The glass ceramic of the present invention can have a specific gravity of 2.2 or more but less than 2.5, or has a low specific gravity. Most of conventional transparent glass ceramics have a specific gravity of 2.5 or more, and a quartz glass has a specific gravity of 2.2, so that such a large specific gravity was a large barrier against use as a substitute for the quartz glass. In contrast, the glass ceramic of the present invention has a specific gravity similar to that of a quartz glass and is advantageous for use as a substitute for the quartz glass.

The glass ceramic of the present invention can be produced, for example, by the following method.

A block of the above matrix glass for a glass ceramic is cut as required and heated up to a temperature of 750° C. or higher from room temperature, to carry out crystallization. In the crystallization, there can be employed a method of gradually increasing a temperature, or increasing a temperature stepwise, from room temperature to approximately 950° C. Preferably, there is employed a "two-steps" heat treatment method in which a cut block of the matrix glass is held at a temperature of 650 to 750° C. for approximately 30 minutes to 2 hours, the temperature is increased to 800 to 950° C., and the cut block is held at 800 to 950° C. for approximately 30 minutes to 2 hours. The temperature elevation rate is preferably 50–300° C./hour. As compared with any conventional glass ceramic, the crystallization step can be carried out for a short period of time.

Alternatively, a molten glass is formed into a thin sheet glass to obtain a matrix glass, the matrix glass is subjected to the crystallization treatment, and then the main surface(s) of the glass ceramic is cut and polished, or the main surface(s) of matrix glass is cut and polished and then subjected to the crystallization treatment, to obtain a glass ceramic substrate. The thus-obtained glass ceramic substrate exhibits a high transmittance in a visible light region, has a light weight and low thermal expansion properties and also has chemical stability. The thus-obtained substrate can be used as a substrate for a display, particularly, a substrate that is opposite to a polysilicon liquid crystal display substrate and constitutes a liquid crystal display (TFT opposite substrate), a dustproof substrate for a liquid crystal projector, a substrate for a reflection mirror of an astronomical telescope or a semiconductor aligner, a diffraction grating, a substrate for an information recording medium, a surface plate, or the like.

A transparent electrically conductive film may be formed on the TFT opposite substrate as required, or an antireflection film may be formed on the dustproof substrate for a liquid crystal projector.

The above glass ceramic can be also used as a substitute for a quartz glass, a measurement standard, or a part of a laser oscillator or a laser gyroscope.

The use of the glass ceramic of the present invention as an opposite substrate and a dustproof substrate for a liquid crystal panel will be explained below. Generally, the liquid crystal panel for use in a liquid crystal display has a liquid crystal layer, a driving substrate that is arranged to face an opposite substrate with the liquid crystal layer between them and is for holding and driving the liquid crystal layer, and an opposite substrate. The driving substrate has a substrate, a pixel electrode provided on the substrate and a switching element connected to the pixel electrode. The opposite substrate has a light-transmitting substrate and an opposite electrode provided in a position of the light-transmitting substrate which position faces the pixel electrode. The liquid crystal layer is held between the driving substrate and the opposite substrate through an alignment film, and is driven by voltage applied between the pixel electrode and the opposite electrode.

In the above constitution, the transmittance of light that comes from the opposite substrate side is controlled in each pixel on the basis of alignment of the liquid crystal layer controlled with the above pixel electrode and the opposite electrode, and the light forms an image. In some liquid crystal panels of the above type, a light-transmitting substrate having a predetermined thickness is attached to an outside of at least one of the driving substrate or the opposite substrate for heat radiation and for preventing deterioration of the image caused when dust adheres to the liquid crystal panel. The glass ceramic of the present invention can be suitably used as an opposite substrate and a dustproof substrate of the above liquid crystal panel.

FIG. 1 schematically shows one example of structure of a liquid crystal panel having a dustproof substrate. In the present invention, the glass ceramic substrate of the present invention is used as a light-transmitting substrate of an opposite substrate 2 of a liquid crystal panel 1, or as transparent substrates 14a and 14b of dustproof substrates 4a and 4b.

The opposite substrate 2 to which the glass ceramic substrate of the present invention is applied will be explained.

The opposite substrate 2 has a structure in which an opposite electrode 20 is formed on a light-transmitting substrate 13 made of the glass ceramic of the present invention. Further, a light-shielding layer 19 for preventing the incidence of light to switching elements 17 formed on a driving substrate is formed in a position facing the switching element 17. The light-shielding layer 19 is formed in a matrix form.

Generally, the above light-shielding layer 19 can be formed of any material that works as a shield against the incidence of light. The light-shielding layer is preferably a high-reflection film formed on the light incidence side for preventing a malfunction caused on a liquid crystal panel by heat absorbed in the light-shielding layer. For preventing a crosstalk in the liquid crystal layer, the light-shielding layer is preferably a low-reflection film on the driving substrate side. More preferably, the light-shielding layer 19 is a stack of films one of which is a high-reflection film on the light incidence side and the other of which is a low-reflection film on the driving substrate side. The light-shielding layer 19 is formed on the light-transmitting substrate 13 by a known photolithography method or the like.

An opposite electrode 20 formed on the light-transmitting substrate 13 is for controlling the alignment of a liquid crystal layer 15 together with a pixel electrode 16 of the driving substrate 3. The opposite electrode 20 is formed from a material transparent to the incidence of light. For example, the material includes a transparent electrically conductive film, and for visible light, an ITO film is formed by a known method.

For effective incidence of light to a pixel region, a substrate having a microlens array may be provided before the opposite substrate (on the light incidence side). Further, a color filter may be formed on the opposite substrate as required, and in this case, color display can be made.

The dustproof substrates 4a and 4b made of the glass ceramic of the present invention each will be explained below. The dustproof substrate 4a or 4b is boned to an outside of the opposite substrate 2 or the driving substrate 3 for preventing a degradation of image qualities caused by dust adhering to the opposite substrate 2 or the driving substrate 3. The dustproof substrates 4a and 4b have a structure in which an anti-reflection film 21a or 21b is formed on a transparent substrate 14a or 14b made of the glass ceramic of the present invention.

When the dustproof substrate 4a is provided to an outside of the opposite substrate 2, an anti-reflection film 21a is formed on the light incidence side of the dustproof substrate 4a. When the dustproof substrate 4b is provided to an outside of the driving substrate 3, an anti-reflection film 21b is formed on the light exit side. The anti-reflection films 21a and 21b can be selected from films having anti-reflection properties to the incidence of light to be employed, and for example, when visible light is employed, an alternately stacked film of $TiO_2$ and $SiO_2$ is known. The anti-reflection films 21a and 21b can be formed on the transparent substrates 14a and 14b by a known method such as a sputtering method, a vapor deposition method, or the like.

The dustproof substrate 4a or 4b is preferably bonded to the opposite substrate 2 or the driving substrate 3 with an adhesive such as an ultraviolet-curable resin. The glass ceramic substrate of the present invention has excellent transmittance to light at and around 365 nm useful for ultraviolet curing as compared with a conventional glass ceramic substrate, so that the bonding with an ultraviolet-curable resin can be performed.

The dustproof substrates 4a and 4b may be provided to outsides of the opposite substrate 2 and the driving substrate 3, or one of the dustproof substrates may be provided to one side. For preventing the incidence of light to a wiring provided for driving the switching element of the driving substrate 3, a light-shielding layer having a predetermined width may be formed in a circumferential region of the dustproof substrate.

As explained above, the glass ceramic substrate of the present invention can be used as an opposite substrate for a liquid crystal panel or a light-transmitting substrate for a dustproof substrate.

According to the present invention, there is also provided a dustproof substrate for a liquid crystal panel, which dustproof substrate uses, as a transparent substrate, the glass ceramic substrate having a spectral transmittance of at least 70% at 400 to 750 nm when the glass ceramic substrate has a thickness of 5 mm and/or a spectral transmittance of at least 85% at 400 to 750 nm when it has a thickness of 1.1 mm. The above glass ceramic substrate preferably has a crystal phase containing a β-quartz solid solution and having an average linear expansion coefficient of $-5\times10^{-7}/°$ C. to $+5\times10^{-7}/°$ C. at a temperature in the range of from 30 to 300° C., and preferably has a specific gravity of 2.2 or more but lass than 2.5.

The glass ceramic of the present invention has excellent transmittance in a visible light region, particularly, in a short wavelength region as compared with any conventional glass ceramic, so that the influence of coloring of images formed by a liquid crystal panel can be decreased. Further, since the glass ceramic of the present invention has a smaller specific gravity than any conventional glass ceramic, it is advantageous for decreasing the weight of a liquid crystal panel. Further, since the glass ceramic of the present invention can be produced with good productivity, substrates can be produced at a lower cost. In view of the above points, the glass ceramic of the present invention can be substituted for a conventional quartz glass as substrate(s) for a liquid crystal panel, and is useful for decreasing the cost of the liquid crystal panel.

As explained above, the opposite substrate and the dustproof substrate made of the glass ceramic of the present invention each can be suitably employed in a liquid crystal panel of a liquid crystal display or a liquid crystal projector.

EXAMPLES

The present invention will be explained further in detail with reference to Examples hereinafter, while the present invention shall not be limited by these Examples.

Examples 1–10 and Comparative Examples 1–3

Oxides, hydroxides, carbonates, nitrates, chlorides, sulfates, etc., were weighed and mixed to obtain compositions as shown in Tables 1 to 3, whereby batch raw materials were prepared. For clarifying and promoting melting of glasses and preventing coloring of the glasses, $Na_2O$, $K_2O$ and $Li_2O$ were used up to a total amount of 0.5 to 2 mol % in the form of sulfates. The sulfates were decomposed and volatilized in the steps of melting under heat and clarification, so that almost no sulfates remained in the glasses obtained. Tables 1 to 3 therefore do not have any particular description of $SO_3$.

In each Example, the above-formulated raw material was placed in a platinum crucible, heated to 1,450 to 1,550° C., melted, stirred, homogenized and clarified, and a molten glass is cast into a mold. After the glass was solidified, the glass was transferred to an electric furnace that had been heated approximately to an annealing point of the glass, to cool the glass to room temperature.

A glass having a size of approximately 300×300×2 mm was prepared from the above-obtained glass block by cutting, and heated in an electric furnace to crystallize the glass, whereby a glass ceramic was obtained. The crystallization was carried out by holding the glass at two stages for, a first holding temperature and a second holding temperature as shown in Tables 1 to 3, a predetermined period of time each. The temperature elevation rate up to the first holding temperature was 200° C./hour, and the temperature elevation rate from the first holding temperature to the second holding temperature was 60° C./hour.

The thus-obtained glass ceramics were measured for physical properties and subjected to X-ray diffraction of precipitated crystal phases. Tables 1 to 3 show the results.

(1) Average linear expansion coefficient

An average linear expansion coefficient in the temperature range of from 30 to 300° C. was calculated on the basis of values obtained by measurement with a thermomechanical analyzer (TMA). (Japan Optical Glass Industry Society Standard was employed, and average linear expansion coefficients obtained by modifying data in the temperature range of from 100 to 300° C. to data in the temperature range of from 30 to 300° C. were used).

(2) Spectral transmittance

A glass ceramic, both surfaces of which were polished to attain a thickness of 2 mm, was measured with a spectrophotometer.

(3) Specific gravity

Measured with a densitometer according to Japan Optical Glass Industry Society Standard.

(4) Size of precipitated crystal phase (average crystal grain diameter)

An electron microscope was used to measure sizes of precipitated crystal phases (to determine an average crystal grain diameter).

Each of glass ceramics obtained in all the Examples had a spectral transmittance of 70% or more at a wavelength of 400 to 750 nm when the value thereof was converted to a value to be obtained when they had a thickness of 5 mm. Further, each of the glass ceramics obtained in all the Examples had a spectral transmittance of 85% or more at a wavelength of 400 to 750 nm when the value thereof was converted to a value to be obtained when they had a thickness of 1.1 mm. The volume of the precipitated crystal glass in the glass ceramics is 50% or more.

TABLE 1

| | Example | | | | |
|---|---|---|---|---|---|
| | 1 | 2 | 3 | 4 | 5 |
| Glass Composition | | | | | |
| $SiO_2$ | 62.9 | 67.0 | 63.0 | 63.0 | 64.3 |
| $Al_2O_3$ | 17.0 | 16.6 | 21.0 | 16.8 | 17.0 |
| $Li_2O$ | 16.0 | 12.0 | 12.0 | 16.0 | 13.5 |
| $Na_2O$ | 0.0 | 0.0 | 0.0 | 1.0 | 0.0 |
| $K_2O$ | 1.0 | 1.0 | 1.0 | 0.0 | 1.0 |
| MgO | 0.0 | 0.0 | 0.0 | 0.0 | 0.0 |
| ZnO | 0.0 | 0.0 | 0.0 | 0.0 | 1.0 |
| $TiO_2$ | 2.0 | 2.0 | 2.0 | 2.0 | 2.0 |
| $ZrO_2$ | 1.0 | 1.0 | 1.0 | 1.0 | 1.0 |
| $Sb_2O_3$ | 0.00 | 0.00 | 0.02 | 0.00 | 0.00 |
| $As_2O_3$ | 0.10 | 0.40 | 0.00 | 0.20 | 0.20 |
| $Na_2O + K_2O$ | 1.00 | 1.00 | 1.00 | 1.00 | 1.00 |
| TAMO* | 17.0 | 13.0 | 13.0 | 17.0 | 14.5 |
| Total | 100.0 | 100.0 | 100.0 | 100.0 | 100.0 |
| First Holding | | | | | |
| Temperature (° C.) | 680 | 700 | 700 | 720 | 700 |
| Time (h) | 1 | 1 | 0.5 | 1 | 1 |
| Second Holding | | | | | |
| Temperature (° C.) | 800 | 850 | 820 | 850 | 850 |
| Time (h) | 1 | 1 | 1 | 0.5 | 1 |
| Crystal phase precipitated | β-q | β-q | β-q | β-q | β-q |
| Average linear expansion coefficient $\alpha 30{-}300$ ($\times 10^{-7}$/° C.) | −7.1 | −5.7 | −1.0 | −10.0 | 0.2 |
| Specific gravity | 2.44 | 2.45 | 2.46 | 2.44 | 2.47 |
| Transmittance at 400 nm (%) | | | | | |
| at thickness of 5 mm | 72 | 79 | 75 | 75 | 76 |
| at thickness of 1.1 mm | 86 | 88 | 87 | 87 | 87 |
| Size of precipitated crystal phase (average crystal grain diameter) (nm) | 50 | 20 | 30 | 30 | 50 |

TAMO* = Total of alkali metal oxides

TABLE 2

| | Example | | | | |
|---|---|---|---|---|---|
| | 6 | 7 | 8 | 9 | 10 |
| Glass Composition | | | | | |
| $SiO_2$ | 64.0 | 65.8 | 65.8 | 66.0 | 65.0 |
| $Al_2O_3$ | 16.5 | 17.0 | 16.5 | 17.0 | 17.0 |
| $Li_2O$ | 14.5 | 13.0 | 11.7 | 12.0 | 14.0 |
| $Na_2O$ | 1.0 | 0.0 | 2.0 | 0.0 | 0.0 |

TABLE 2-continued

| | Example | | | | |
|---|---|---|---|---|---|
| | 6 | 7 | 8 | 9 | 10 |
| $K_2O$ | 1.0 | 1.0 | 0.0 | 1.0 | 1.0 |
| MgO | 0.0 | 0.0 | 1.0 | 1.0 | 0.0 |
| ZnO | 0.0 | 0.0 | 0.0 | 0.0 | 0.0 |
| $TiO_2$ | 2.0 | 2.4 | 2.0 | 2.0 | 2.0 |
| $ZrO_2$ | 1.0 | 0.6 | 1.0 | 1.0 | 1.0 |
| $Sb_2O_3$ | 0.02 | 0.00 | 0.02 | 0.02 | 0.00 |
| $As_2O_3$ | 0.00 | 0.20 | 0.00 | 0.00 | 0.00 |
| $Na_2O + K_2O$ | 2.00 | 1.00 | 2.00 | 1.00 | 1.00 |
| TAMO* | 16.5 | 14.0 | 13.7 | 13.0 | 15.0 |
| Total | 100.0 | 100.0 | 100.0 | 100.0 | 100.0 |
| First Holding | | | | | |
| Temperature (° C.) | 720 | 700 | 700 | 650 | 700 |
| Time (h) | 1 | 1 | 1 | 2 | 2 |
| Second Holding | | | | | |
| Temperature (° C.) | 820 | 850 | 830 | 850 | 850 |
| Time (h) | 1 | 1 | 2 | 2 | 2 |
| Crystal phase precipitated | β-q | β-q | β-q | β-q | β-q |
| Average linear expansion coefficient $\alpha 30{-}300$ ($\times 10^{-7}$/° C.) | 1.0 | 4.5 | 0.0 | −2.0 | −4.6 |
| Specific gravity | 2.44 | 2.45 | 2.47 | 2.48 | 2.45 |
| Transmittance at 400 nm (%) | | | | | |
| at thickness of 5 mm | 71 | 72 | 74 | 76 | 78 |
| at thickness of 1.1 mm | 85 | 86 | 87 | 87 | 88 |
| Size of precipitated crystal phase (average crystal grain diameter) (nm) | 50 | 50 | 40 | 30 | 20 |

TAMO* = Total of alkali metal oxides

TABLE 3

| | Comparative Example | | |
|---|---|---|---|
| | 1 | 2 | 3 |
| Glass Composition | | | |
| $SiO_2$ | 63.8 | 64.9 | 70.9 |
| $Al_2O_3$ | 17.1 | 16.3 | 14.5 |
| $Li_2O$ | 8.5 | 10.1 | 9.2 |
| $Na_2O$ | 0.6 | 0.0 | 0.6 |
| $K_2O$ | 0.0 | 0.0 | 0.2 |
| MgO | 1.7 | 4.1 | 0.8 |
| ZnO | 1.2 | 1.0 | 0.0 |
| $P_2O_5$ | 3.8 | 0.0 | 0.6 |
| $TiO_2$ | 2.0 | 2.1 | 1.6 |
| $ZrO_2$ | 1.1 | 1.1 | 1.2 |
| $Sb_2O_3$ | 0.00 | 0.40 | 0.00 |
| $As_2O_3$ | 0.20 | 0.00 | 0.40 |
| $Na_2O + K_2O$ | 0.60 | 0.00 | 0.80 |
| TAMO* | 9.1 | 10.1 | 10.0 |
| Total | 100.0 | 100.0 | 100.0 |
| First Holding | | | |
| Temperature (° C.) | 800 | 700 | 700 |
| Time (h) | 24 | 10 | 2 |
| Second Holding | | | |
| Temperature (° C.) | | 820 | 850 |
| Time (h) | | 10 | 1 |
| Crystal phase precipitated | β-q | β-q | β-q |
| Average linear expansion coefficient $\alpha 30{-}300$ ($\times 10^{-7}$/° C.) | 0.0 | 10.0 | −7.2 |

TABLE 3-continued

| | Comparative Example | | |
|---|---|---|---|
| | 1 | 2 | 3 |
| Specific gravity | 2.53 | 2.57 | 2.51 |
| Transmittance at 400 nm (%) | | | |
| at thickness of 5 mm | 64 | 56 | 61 |
| at thickness of 1.1 mm | 82 | 75 | 80 |
| Size of precipitated crystal phase (average crystal grain diameter) (nm) | 30 | 50 | 30 |

TAMO* = Total of alkali metal oxides

Notes to Tables 1 to 3:
1) "β-q" refers to a β-quartz solid solution.
2) Concerning any contents of components other than less than 0.1 mol % of any component, the contents thereof were rounded of to one decimal place.

Both surfaces of the glass ceramic plates obtained in Examples are cut and polished, to give glass ceramic substrates. When dimensions of the glass ceramic substrate are determined depending upon use, the thus-obtained substrate can be used as a substrate for a display, particularly, a TFT opposite substrate, a dustproof substrate for a liquid crystal projector, a substrate for a reflection mirror of an astronomical telescope or a semiconductor aligner, a diffraction grating, a substrate for an information recording medium, a surface plate, or the like.

The above glass ceramic can be also used as a substitute for a quartz glass, a measurement standard, or a part of a laser oscillator or a laser gyroscope.

Example 11

Example 11 shows examples in which the glass ceramics obtained in Examples 1 to 10 were used for making opposite substrates for use in a liquid crystal panel of a liquid crystal projector.

Figure 2:
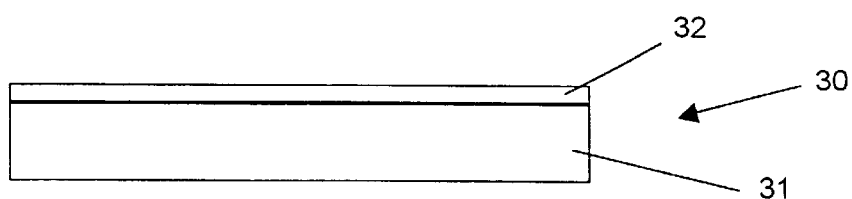
FIG. 2 schematically shows an opposite substrate in Example 11 of the present invention.

FIG. 2 schematically shows an opposite substrate 30 in this Example. The opposite substrate 30 is structured by forming an opposite electrode 32 on a light-transmitting substrate 31 made of the glass ceramic of the present invention.

First, both main surfaces of the glass ceramic plate obtained in any one of Examples 1 to 10 were cut and polished, and then the glass ceramic plate was cut to obtain a glass substrate having a size of 200 mm×200 mm and a thickness of 1.1 mm.

Then, an ITO film having a thickness of 140 nm, which was to constitute an opposite electrode for driving a liquid crystal, was formed on one surface of the glass substrate. The ITO film was formed by a sputtering method. The obtained ITO film had a sheet resistance of 20 Ω/□.

Further, the glass substrate having the ITO film formed thereon was cut to a size of 20 mm×18 mm.

In this manner, opposite substrates 30 for liquid crystal panels in this Example were obtained, in each of which the ITO film 32 was formed on the substrate 31.

The opposite substrates for a liquid crystal panel, obtained in this Example, were used to fabricate liquid crystal panels for a projection type liquid crystal projector. When any one of the glass ceramics obtained in Examples 1 to 10 was used, less colored and excellent images were obtained. It has been found that the opposite substrate for a liquid crystal panel, made of the glass ceramic of the present invention, can be used as a substitute for a conventional opposite substrate made of quartz.

Example 12

Example 12 shows examples in which the glass ceramics obtained in Examples 1 to 10 were similarly used for making opposite substrates for use in a liquid crystal panel of a liquid crystal projector. Example 12 differs from Example 11 in that, in this Example 12, a pattern of light-shielding layer (black matrix) for preventing the incidence of light into a switching element such as TFT formed on a driving substrate was formed on a light-transmitting substrate made of the glass ceramic of the present invention.

FIGS. 3(a) to 3(d) schematically show the steps of producing the opposite substrate in this Example.

Like Example 11, a glass substrate 41 having a size of 200 mm×200 mm and a thickness of 1.1 mm was obtained from one of the glass ceramic plates obtained in Examples 1 to 10.

Figure 3:
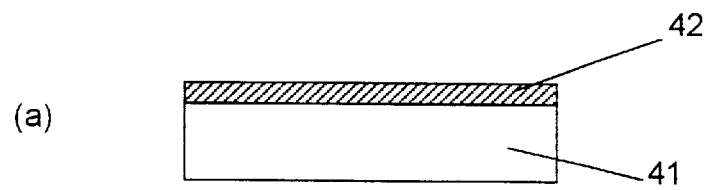
FIG. 3 schematically shows the steps of producing an opposite substrate in Example 12 of the present invention.
Figure 3:
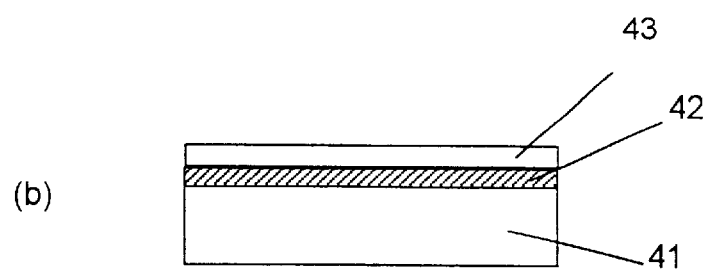
Figure 3:
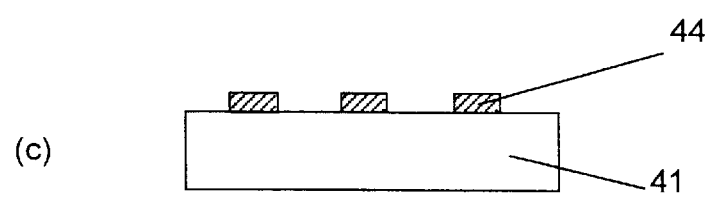
Figure 3:
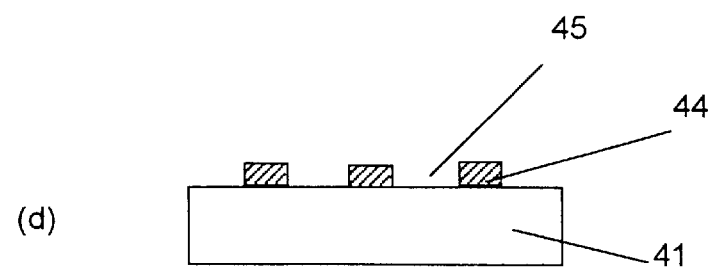

Then, a light-shielding layer 42 having a thickness of 100 nm was formed on one surface of the glass substrate 41 (FIG. 3(a)). The light-shielding layer 42 had the laminated structure of two layers, one layer being a high-reflection film that was formed on the glass substrate side and had high-reflection to the incidence of light, the other layer being a low-reflection film formed on the liquid crystal side. This Example used an aluminum layer as a high-reflection film, and a chromium nitride layer as a low-reflection film.

The above light-shielding layer 42 was formed by a sputtering method. Specifically, as a target material, there was used a target material that had a width of 15 cm and was made of aluminum covering a width of 5 cm on the substrate entrance side and of chromium covering a width of 10 cm on the substrate exit side, and the target was continuously sputtered with an inline sputtering apparatus, to form the layer. Further, when the chromium nitride layer was formed, argon gas containing nitrogen was allowed to flow from the substrate exit side.

In the above manner, an aluminum thin film having a thickness of 20 nm was formed on the glass substrate 41, and a chromium nitride thin film having a thickness of 80 nm was formed thereon. In this case, a mixture region containing aluminum and chromium nitride was formed in an interface between the aluminum thin film and the chromium nitride thin film. In the mixture region, the aluminum concentration continuously decreased from the glass substrate side to the chromium nitride layer side.

Then, a predetermined pattern 44 was formed on the light-shielding layer 42 formed. The pattern 44 of the light-shielding layer 42 was formed in a position where the light-shielding layer 42 prevents the incidence of light to a switching element of the driving substrate provided so as to face the opposite substrate with a liquid crystal layer between them.

First, a photosensitive layer (resist) 43 having a thickness of 500 nm was formed on the chromium nitride film of the light-shielding layer 42 (FIG. 3(b)). Further, the resist layer was formed in a matrix form having a width of 4 μm and a pitch of 26 μm with using a photomask.

Then, the substrate having the formed resist layer in the matrix form was immersed in a chromium etching solution (HY solution, supplied by Wako Purechemical K.K.) to etch the chromium nitride thin film in accordance with the formed resist pattern, whereby a pattern was formed in the chromium nitride thin film. Then, the above substrate was immersed in an alkaline aqueous solution as a solution for removing the resist, to remove the resist layer and, at the same time, to etch the aluminum thin film, whereby a pattern according to the chromium nitride thin film pattern was formed in the aluminum thin film. In this manner, a light-shielding pattern 44 was formed in the light-shielding layer 42 (FIG. 3(c)).

Then, an ITO film 45 having a thickness of 140 nm, which was an opposite electrode as a liquid crystal driving electrode, was formed on the glass substrate so as to cover the light-shielding pattern 44 (FIG. 3(d)).

The ITO film was formed by a sputtering method. The thus-obtained ITO film 45 had a sheet resistance of 25 Ω/□.

Further, the glass substrate 41 having the formed light-shielding pattern 44 and the formed ITO film 45 was cut to a size of 20 mm×18 mm.

In the above manner, the opposite substrates for liquid crystal panels were obtained in this Example.

The opposite substrates for a liquid crystal panel, obtained in this Example, were used to fabricate liquid crystal panels for a projection type liquid crystal projector. When any one of the glass ceramics obtained in Examples 1 to 10 was used, less colored and excellent images were obtained. It has been found that the opposite substrate for a liquid crystal panel, made of the glass ceramic of the present invention, can be used as a substitute for a conventional opposite substrate made of quartz.

Example 13

Example 13 shows examples in which the glass ceramic of the present invention was used to fabricate a dustproof substrate for use in a liquid crystal panel of a liquid crystal projector.

Figure 4:
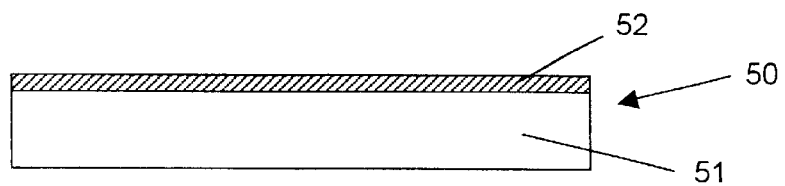
FIG. 4 schematically shows a dustproof substrate of Example 13 of the present invention.

FIG. 4 schematically shows a dustproof substrate 50 of this Example.

First, two main surfaces of each of the glass ceramic plates obtained in Examples 1 to 10, as transparent substrates, were cut and polished, and then the glass substrate plates were cut to obtain glass substrates having a size of 200 mm×200 mm and a thickness of 1.1 mm each.

Then, an anti-reflection film to visible light (wavelength 430–650 nm) was formed on one surface of each glass substrate. Each anti-reflection film had a three-layered structure in which an aluminum oxide ($Al_2O_3$) layer, a zirconium oxide ($ZrO_2$) layer and a magnesium fluoride ($MgF_2$) layer were laminated in this order from the glass substrate side. The above-formed layers had a thickness of approximately 83 nm, approximately 132 nm and approximately 98 nm.

The above anti-reflection films were formed by consecutive vacuum deposition of materials for the layers.

The substrate having the above anti-reflection films formed thereon had a transmittance of 96% or more to visible light (wavelength 430–650 nm) and a reflectance of 0.6% or lower.

Then, the glass substrates having the anti-reflection films formed thereon were cut to a size of 25 mm×18 mm.

In the above manner, dustproof substrates 50 of this Example having the anti-reflection films 52 formed on the transparent substrate 51 were obtained.

The dustproof substrates 50 for a liquid crystal panel, obtained in this Example, were used to fabricate liquid crystal panels for a projection type liquid crystal projector.

In each case, the dustproof substrates were bonded to outsides of the opposite substrate and the driving substrate, and an ultraviolet-curable resin was used for the bonding. Since the ultraviolet-curable resin was used, the time period for the bonding step was greatly decreased as compared with a case where a conventional heat-curable resin was used for bonding.

When any one of the glass ceramics obtained in Examples 1 to 10 was used for fabricating the above liquid crystal panel, less colored and excellent images were obtained. It has been found that the dustproof substrate made of the glass ceramic of the present invention can be used as a substitute for a dustproof substrate made of quartz.

In addition, the opposite substrate and the dustproof substrate made of the glass ceramic of the present invention can be also applied to reflection type liquid crystal panels of reflection type projector, and the like.

EFFECT OF THE INVENTION

The matrix glass for the glass ceramic of the present invention has a relatively low melting temperature, so that a remarkably homogeneous matrix glass can be obtained with a melting furnace for a general optical glass. Further, it has a composition that is not easily colored, and moreover, impurities that will cause coloring do not easily come from a container or a refractory furnace during melting thereof, so that the glass ceramic of the present invention having a high spectral transmittance, low thermal expansion properties and a small specific gravity can be produced by carrying out crystallization treatment for a relatively short period of time.

Further, since the glass ceramic of the present invention has a high spectral transmittance in a visible light region, low thermal expansion properties and a small specific gravity, it can be used as a substitute material for an expensive quartz glass. Further, since it has a low thermal expansion coefficient, it can give a material excellent in heat shock resistance.

Furthermore, since the glass ceramic substrate of the present invention has the above glass ceramic as a substrate material, it has features such as transparency, low thermal expansion and being light in weight, so that it can be suitably used in various fields including a dustproof substrate for a liquid crystal projector, and the like.

Moreover, the opposite substrate and the dustproof substrate for a liquid crystal panel, which comprise the glass ceramic substrate of the present invention, have a light weight and are therefore advantageous for decreasing the weight of a liquid crystal panel. Further, the glass ceramic itself has excellent productivity, so that it can be produced at a low cost.

What is claimed is:

1. A glass ceramic having a crystal phase containing a β-quartz solid solution precipitated by heat treatment of a matrix glass for a glass ceramic, the matrix glass having a glass composition comprising 55 to 70 mol % of $SiO_2$, 13 to 23 mol % of $Al_2O_3$, 11 to 21 mol % of an alkali metal oxide, provided that the alkali metal oxide contains 10 to 20 mol % of $Li_2O$ and contains 0.1 to 3 mol % of $Na_2O$ and $K_2O$ in total, 0.1 to 4 mol % of $TiO_2$ and 0.1 to 2 mol % of $ZrO_2$, the total content of said components being at least 95 mol %, and further comprising 0 to less than 0.2 mol % of BaO, 0 to less than 0.1 mol % of $P_2O_5$, 0 to less than 0.3 mol % of $B_2O_3$ and 0 to less than 0.1 mol % of $SnO_2$.

2. The glass ceramic of claim 1, wherein the glass matrix contains at least one component selected from the group consisting of $Cs_2O$, MgO, CaO, SrO, ZnO, $La_2O_3$, $Nb_2O_5$, $Y_2O_3$, $Bi_2O_3$, $WO_3$, $As_2O_3$, $Sb_2O_3$, F and $SO_3$, and the total content of the at least one component selected from said group and BaO, $P_2O_5$, $B_2O_3$ and $SnO_2$ is 5 mol % or less.

3. A glass ceramic having a crystal phase containing a β-quartz solid solution precipitated by heat treatment of a matrix glass for a glass ceramic and having a spectral transmittance of at least 70% at 400 to 750 nm when it has a thickness of 5 mm, the matrix glass having a glass composition comprising 55 to 70 mol % of $SiO_2$, 13 to 23 mol % of $Al_2O_3$, 11 to 21 mol % of alkali metal oxides, provided that the content of $Li_2O$ is 10 to 20 mol % and that the total content of $Na_2O$ and $K_2O$ is 0.1 to 3 mol %, 0.1 to 4 mol % of $TiO_2$ and 0.1 to 2 mol % of $ZrO_2$, the total content of said components being at least 95 mol %.

4. A glass ceramic having a crystal phase containing a β-quartz solid solution precipitated by heat treatment of a matrix glass for a glass ceramic and having a spectral transmittance of at least 85% at 400 to 750 nm when it has a thickness of 1.1 mm, the matrix glass having a glass composition comprising 55 to 70 mol % of $SiO_2$, 13 to 23 mol % of $Al_2O_3$, 11 to 21 mol % of an alkali metal oxide, provided that the alkali metal oxide contains 10 to 20 mol % of $Li_2O$ and contains 0.1 to 3 mol % of $Na_2O$ and $K_2O$ in total, 0.1 to 4 mol % of $TiO_2$ and 0.1 to 2 mol % of $ZrO_2$, the total content of said components being at least 95 mol %.

5. The glass ceramic of claim 3 or 4, wherein the matrix glass contains 5 mol % or less of at least one component selected from the group consisting of $Cs_2O$, MgO, CaO, SrO, BaO, ZnO, $La_2O_3$, $Nb_2O_5$, $Y_2O_3$, $Bi_2O_3$, $WO_3$, $P_2O_5$, $B_2O_3$, $As_2O_3$, $Sb_2O_3$, $SnO_2$, F and $SO_3$.

6. The glass ceramic of claim 1, which has an average linear expansion coefficient of from $-10\times10^{-7}/°$ C. to $+10\times10^{-7}/°$ C. in a temperature range of from 30° C. to 300° C.

7. A glass ceramic having a matrix glass containing 0.1 to 3 mol % $Na_2O$ and $K_2O$ in total and a crystal phase containing a β-quartz solid solution, having a spectral transmittance of at least 70% at 400 to 750 nm when it has a thickness of 5 mm, and $Li_2O$ in an amount to provide an average linear expansion coefficient of from $-10\times10^{-7}/°$ C. to $+10\times10^{-7}/°$ C. in a temperature range of from 30° C. to 300° C.

8. A glass ceramic having a matrix glass containing 0.1 to 3 mol % $Na_2O$ and $K_2O$ in total and a crystal phase containing a β-quartz solid solution, having a spectral transmittance of at least 85% at 400 to 750 nm when it has a thickness of 1.1 mm, and $Li_2O$ in an amount to provide an average linear expansion coefficient of from $-10\times10^{-7}/°$ C. to $+10\times10^{-7}/°$ C. in a temperature range of from 30° C. to 300° C.

9. The glass of claim 1, wherein the crystal phase has a volume of at least 50% based on the total volume of the glass ceramic.

10. The glass of claim 1, wherein the crystal phase has an average crystal grain size of 5 to 100 nm.

11. The glass of claim 1 which has a specific gravity of 2.2 or more but less than 2.5.

12. A glass ceramic substrate comprising the glass ceramic of claim 1.

13. An opposite substrate for use in a liquid crystal panel having a light-transmitting substrate and an opposite electrode formed thereon, the light-transmitting substrate being the glass ceramic substrate of claim 12.

14. The opposite substrate of claim 13, wherein the liquid crystal panel has (a) a driving substrate having a substrate, a pixel electrode formed on said substrate and a switching element connected to said pixel electrode, (b) an opposite substrate that is positioned opposite to said driving substrate through a predetermined space and has a light-transmitting substrate and an opposite electrode in a position being on said light-transmitting substrate and facing said pixel electrode, and (c) a liquid crystal layer which is held in a predetermined space formed between said driving substrate and a driving substrate and is drivable by a voltage upon application of the voltage between said pixel electrode and the opposite electrode.

15. The opposite substrate of claim 14, which further has a light-shielding film formed in a position that is opposite to the switching element of the driving substrate and is on the light-transmitting substrate.

16. A dustproof substrate for a liquid crystal panel having a transparent substrate and an anti-reflection film formed thereon, the transparent substrate being the glass ceramic substrate of claim 12.

17. A dustproof substrate for a liquid crystal panel having a transparent substrate and an anti-reflection film formed thereon, the transparent substrate being a glass ceramic substrate which has a spectral transmittance of at least 70% at 400 to 750 nm when it has a thickness of 5 mm.

18. A dustproof substrate for a liquid crystal panel having a transparent substrate and an anti-reflection film formed thereon, the transparent substrate being made of a glass ceramic substrate which has a spectral transmittance of at least 85% at 400 to 750 nm when it has a thickness of 1.1 mm.

19. The dustproof substrate of claim, 17 or 18, wherein the glass ceramic substrate has a crystal phase containing a β-quartz solid solution and has an average linear expansion coefficient of from $-5\times10^{-7}/°$ C. to $+5\times10^{-7}/°$ C. in a temperature range of from 30° C. to 300° C.

20. The dustproof substrate as recited of claim 17 or 18 wherein the glass ceramic substrate has a specific gravity of at least 2.2 but less than 2.5.

21. The dust proof substrate of claim 16, wherein the liquid crystal panel has (a) a driving substrate having a substrate, a pixel electrode formed on said substrate and a switching element connected to said pixel electrode, (b) an opposite substrate that is positioned opposite to said driving substrate through a predetermined space and has a light-transmitting substrate and an opposite electrode in a position being on said light-transmitting substrate and facing said pixel electrode, and (c) a liquid crystal layer which is held in a predetermined space formed between said driving substrate and an opposite substrate and is drivable by a voltage upon application of the voltage between said pixel electrode and the opposite electrode, the dustproof substrate being for use on an outer surface of at least one of said driving substrate and said opposite substrate.

22. The glass ceramic of claim 7, wherein the amount of $Li_2O$ is 10 to 20 mol %.

23. The glass ceramic of claim 8, wherein the amount of $Li_2O$ is 10 to 20 mol %.

* * * * *